United States Patent [19]
Rasmussen et al.

[11] 3,874,244
[45] Apr. 1, 1975

[54] CAMPER LOADING AND SECURING SYSTEM

[76] Inventors: Reed Rasmussen, 168 W. Gentile, Layton, Utah 84041; Carl M. Rasmussen, 197 E. 1400 South, Bountiful, Utah 84010

[22] Filed: Nov. 19, 1973

[21] Appl. No.: 417,314

Related U.S. Application Data

[62] Division of Ser. No. 305,755, Nov. 13, 1972, Pat. No. 3,819,077.

[52] U.S. Cl................................. 74/30, 403/483
[51] Int. Cl.................................. F16h 19/04
[58] Field of Search .......... 74/34, 29; 403/383, 361

[56] References Cited
UNITED STATES PATENTS

| | | | |
|---|---|---|---|
| 1,064,785 | 6/1913 | Stewart | 74/34 |
| 1,134,179 | 4/1915 | Boyd | 403/383 |
| 3,400,593 | 9/1968 | Darnell | 74/29 |
| 3,485,520 | 12/1969 | Alexander | 403/361 |
| R26,093 | 10/1966 | Ingram | 74/29 |

*Primary Examiner*—Wesley S. Ratliff, Jr.
*Attorney, Agent, or Firm*—H. Ross Workman

[57] ABSTRACT

A camper loading apparatus wherein a direct drive pinion assembly releasably affixed to the rear of a transportable bed engages corresponding racks on a camping unit. The pinion assembly becomes locked to both the transportable bed and the camper when the camper is fully loaded onto the bed. Each of the loading pinions may be selectively rotated individually or in unison to accomplish the loading operation. The invention provides supporting structure for the camper while remaining detachable thereby allowing the transportable bed to be used for other purposes without cumbersome or interfering structure.

4 Claims, 6 Drawing Figures

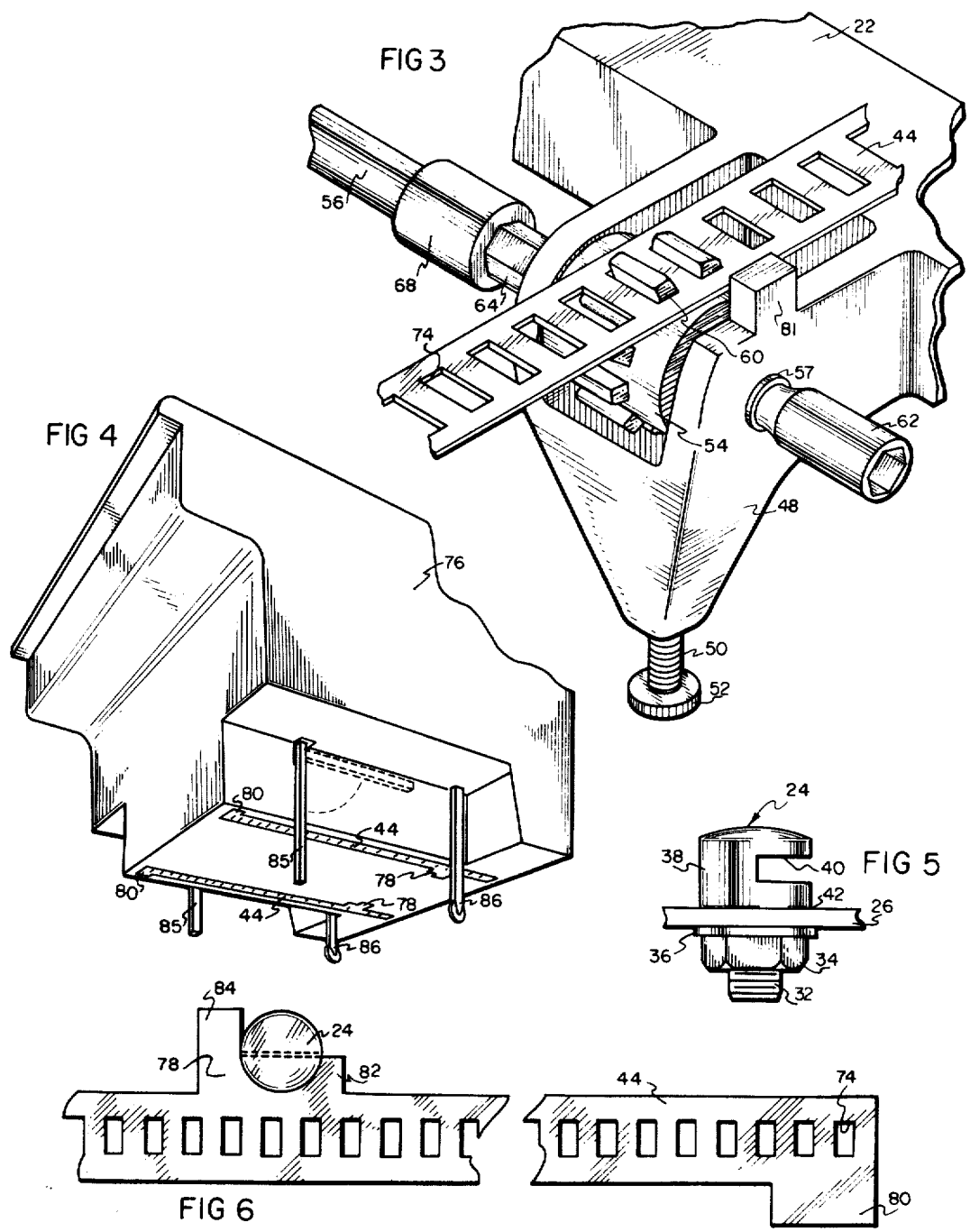

CAMPER LOADING AND SECURING SYSTEM

This is a division of application Ser. No. 305,755, filed Nov. 13, 1972, now U.S. Pat. No. 3,819,077.

BACKGROUND OF THE INVENTION

1. Field of Invention

This invention relates to camper loading systems and more particularly to camper loading systems employing a pinion and rack assembly for translating a camper forward and rearward with respect to a transportable bed.

2. The Prior Art

With the recent increase in public interest in the recreational activity of camping and particularly with the increase in popularity of the truck camper, there has arisen a need for a simple system whereby one person may load and unload a camper from a truck bed. It is generally desired by the owner of a truck camping unit to be able to use the truck separately from the camper for purposes other than camping.

The conventional camper unit is removable from the truck bed, but only with the use of winches, jacks, or other lifting devices. Furthermore, the conventional removal apparatus demands the efforts of at least two people to assure that the truck is driven from under the elevated camper without contacting any of the supports or to prevent the unit from accidentally being pushed off the end of the truck in the case of a winch assembly.

Recently, there has been shown use of a rack and pinion assembly to translate the camper along the truck bed in the loading and unloading operation. Systems such as those shown in U.S. Pat. Nos. 3,229,839; 3,409,154; or 3,601,271, use a rack and pinion assembly in differing ways. These recent attempts at simplification and improvement have not eliminated many of the problems associated with permanent attachment of the loading mechanism to the truck, extensive gearing, camper alignment, or retention of the camper to keep it from falling off the end of the truck during unloading.

For the above-described reasons it is desirable to use a camper loading system which provides for minimal structure attached permanently to the transportable bed; which eliminates gearing, which selectively allows independent rotation of either drive pinion for alignment of the camper; and which provides a retention means to keep the camper from being dropped from the end of the transportable bed.

BRIEF SUMMARY AND OBJECTS OF THE INVENTION

The present invention comprises novel apparatus for loading and unloading a camper unit from a transportable bed which substantially overcomes the above set forth deficiencies in the prior art. The invention allows one person to complete the entire loading and unloading process with little specialized skill or elaborate procedure. Furthermore, the invention provides means for securely retaining the fully loaded camper from the undesirable side-to-side, forward and upward movement of the camper with respect to the transportable bed.

It is, therefore, a primary object of this invention to provide an improved camper loading and unloading apparatus.

It is another object of the invention to provide a novel method for loading a camper on a transportable bed.

These and other objects and features of the invention will become more fully apparent from the following description and appended claims taken in conjunction with the accompanying drawings.

BRIEF DESCRIPTION OF THE DRAWINGS

FIG. 3 is a fragmentary perspective illustration of one drive pinion and one corresponding rack which is shown engaged by the pinion.

FIG. 4 is a schematic perspective view of a camping unit particularly showing the racks of FIG. 3 mounted along the bottom of the unit.

FIG. 5 is a side elevational view of a presently preferred rack interlocking retainer embodiment.

FIG. 6 is a fragmentary horizontal plan view of the interlocking retainer and corresponding rack illustrated in the fully loaded position.

DETAILED DESCRIPTION OF THE PREFERRED EMBODIMENTS

GENERAL

Although the invention illustrated in FIG. 1 may be used for loading, unloading and securing a camper unit to any transportable bed such as a trailer, railroad car, or truck, the present invention will be described, for simplicity, in connection with its use with a truck. In this specification, transportable bed is defined to mean trailer, railroad car or truck bed.

With the widely expanded use of truck campers, the need for a simple, detachable and inexpensive camper loading device which can be operated by one person has become accentuated. Until the present invention, the loading of a camper has either required two people working in combination or the permanent installation of complex and expensive camper handling equipment.

Through the use of a rack and pinion assembly, the present invention translates a camper forward and rearward on a truck bed. A part of the rack and pinion assembly is an interlocking mechanism which prevents movement of a fully loaded camper in any direction except to the rear of the truck bed. Another portion of the rack and pinion assembly is a slidable shaft and socket which allows either of the two drive pinions to be turned independently with respect to the other or which mechanically unites the two pinions thereby causing them to rotate in unison. Still another portion of the rack and pinion assembly is formed by detent extensions on the forward sides of the racks which prevent the camper from being accidentally dropped from the rear of the truck by arresting the rearward momentum of the camper when it is almost fully disengaged from the truck bed.

THE CAMPER LOADER

Figure 1:
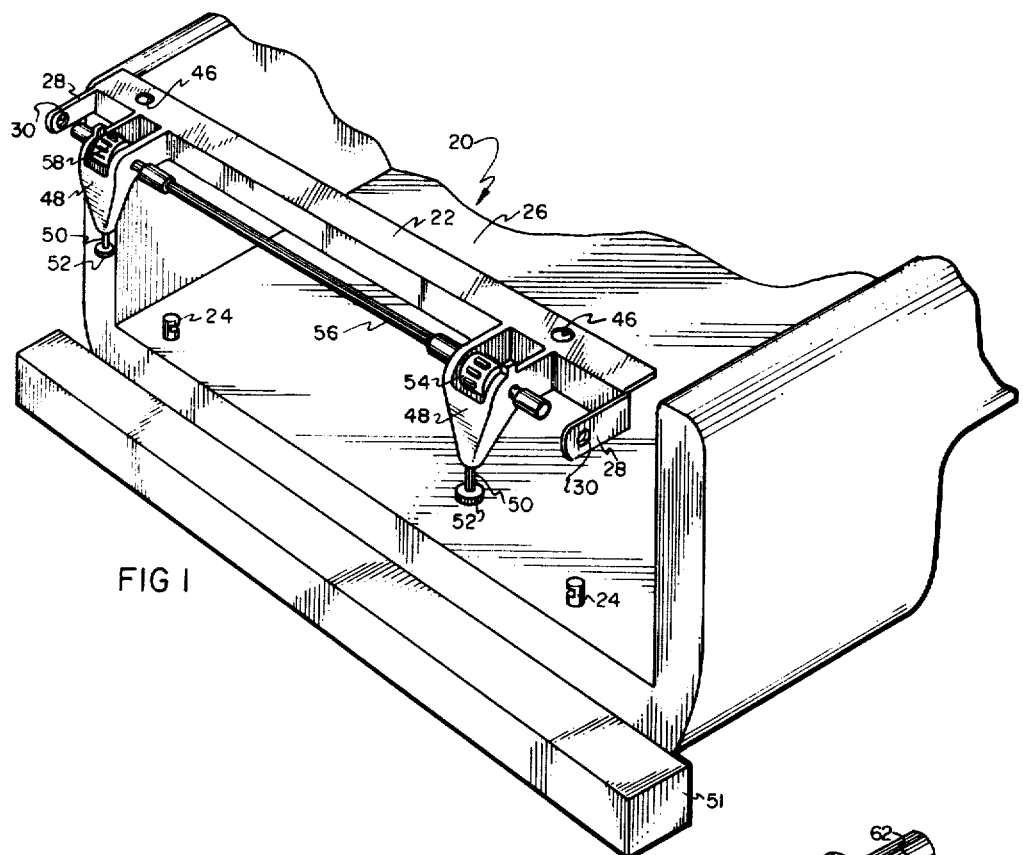
FIG. 1 is an exploded fragmentary perspective view of a presently preferred embodiment of the invention shown in relation to the rear of a transportable bed.

According to the presently preferred embodiment of the invention, as illustrated in FIG. 1, a camper loader assembly 20 is provided. The loader assembly 20 includes three principal portions: a frame portion 22, an interlocking retainer portion 24, and a track portion 44 (see FIG. 4). The frame portion 22 and the interlocking retainer portion 24 cooperate to make a significant number of the structural and mechanical parts of the invention easily removable from the truck bed 26 when there is no camper loaded. When a camper unit is loaded, however, the separable portions 22 and 24 cooperate to provide structural strength to secure the camper to a truck bed 26.

Interlocking retainers 24 are attached by suitable means, e.g. bolted, welded, or riveted, to the right and left sides of the truck bed 26. A presently preferred embodiment of the interlocking retainer 24 is shown in FIG. 5. The retainer 24 is generally circular in cross-section and is formed with a diametrally reduced, threaded lower portion 32. A nut 34, which engages threads 32, secures the interlocking retainer 24 to the truck bed 26. Interposed between the nut 34 and the truck bed 26 is a suitable locking washer 36.

On the upper portion of the interlocking retainer 24, a smoothed enlarged head 38 is formed. The head 38 is significantly larger than the threaded lower portion 32. The head 38 of each retainer 24 has a notch 40 which opens toward the center line of the truck bed. The notch 40 extends approximately one-half of the diametral distance through the head 38. Although the notch 40 is shown spaced a vertical distance from the base 42 of the head 38 allowing frame 22 (see FIG. 1) to be positioned between the truck bed 26 and the lower edge of the notch 40, it would be equally desirable to extend the notch 40 downward to the truck bed 26.

As will be recognized, the interlocking retainers 24 must be formed from material which is of sufficient shear strength to maintain all of the translational force required in moving the camper forward and rearward with respect to the truck bed and the forces exerted during transportation of the camper. In addition, it is desirable to minimize the size of the interlocking retainer 24 in order to provide as little interfering structure as possible when the truck is not used for camping purposes. When the truck is not used for camping purposes, the two interlocking retainers constitute the only structure remaining attached to the truck bed. Of course, it should be recognized that the interlocking retainers may be used with suitable coupling sites to hold any other rear mounted equipment on the truck bed as well as a camper loader.

With further reference to FIG. 1, a frame 22 is provided. Near the ends of the frame 22 apertures 46 are formed. The apertures 46 are placed along frame 22 at suitable positions for receiving the interlocking retainers 24 when a camper is to be loaded. Aperture 46 is of sufficient diametral size to allow the entire head 38 (see FIG. 5) of the interlocking retainer to pass through the aperture.

On the rearward side of frame 22 crank alignment braces 28 are provided. The crank alignment braces 28 have apertures 30 which are formed in the braces and are slightly larger than the body of a suitable crank (not shown) which is desired for use in rotating pinions 54 and 58 as will be more fully described hereinafter. Each aperture 30 is positioned along the brace 28 such that a crank inserted through the aperture will be held in alignment with a receiving socket 62 or 74 to be described more fully hereinafter.

Pinion housings 48 are located on the rearward side of frame 22 slightly toward the center thereof and spaced from the crank alignment braces 28. A presently preferred embodiment of the pinion housing 48 is shown in FIG. 3. The pinion housing 48 is open along the top and part of the trailing face to allow a pinion 54 to engage a rack 44. The pinion housing 48 also provides bushings 57 to allow a pinion drive shaft to pass through the housing. The lower end of the pinion housing 48 is inwardly tapered and defines a threaded receptacle (not shown) for an extensible threaded shaft 50. The threaded receptacle is oriented so that the extensible shaft 50 is generally vertically oriented. A foot 52 is formed on the lower end of the shaft 50. The shaft 50 and associated foot 52 are extended by advancing the threaded shaft with respect to the housing 48 so as to cause the shaft to rest upon the bumper 51 of the truck to form a vertical support for the pinion housing 48. It should be recognized that any other conventional extending means could be used to support the housing 48. A threaded shaft has been found desirable for the purpose in the embodiment illustrated.

One side of the pinion housing 48 is formed with an upwardly projecting detent tab or boss 81 which cooperates with a detent 80 (see FIG. 6) on the rack 44 to arrest rearward momentum of the unloaded camper thereby preventing it from falling from the end of the truck bed.

Figure 2:
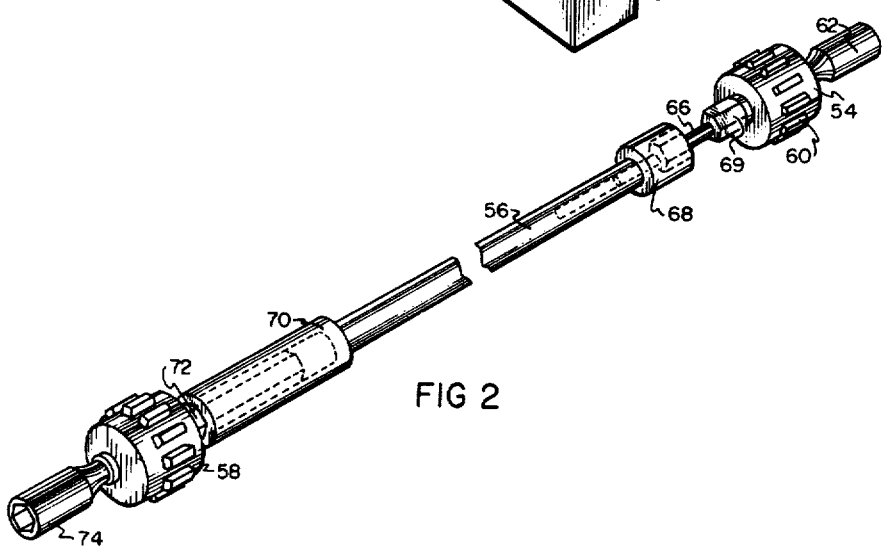
FIG. 2 is a fragmentary perspective illustration of the slidable coupling shaft and associated drive pinions.

Within the right-hand pinion housing 48, drive pinion 54 is retained (see FIG. 3). As best illustrated in FIG. 2, pinion 54 is formed with a plurality of teeth 60. The teeth 60 are spaced evenly around the circumference of the pinion 54. A coupling 62 is formed on one end of the drive pinion 54 to mechanically engage the shaft of an appropriate crank (not shown). The coupling 62 is directly mechanically coupled with the pinion 54. On the other end of the pinion 54 another mechanical fitting 64 is formed. The fitting 64, in the illustrated embodiment, is in the configuration of a regular hexagon. Fitting 64, like coupling 62, is integral with the pinion 54. A peripherally smooth centering rod 66 extends coaxially away from the fitting 64 and is integral with the fitting 64, the pinion 54 and the coupling 62.

A slidable connecting shaft 56 internally accommodates the centering rod 66 of the pinion assembly 54. One end of the connecting shaft 56 is formed as a socket 68 having an internal configuration which will mechanically engage the pinion fitting 64. The connecting shaft 56 is of a length that will allow it to be displaced axially away from the assembly 54 and thereby become disengaged from fitting 64 but still retain centering rod 66 internally.

On the other end of connecting shaft 56 an elongated socket 70 is mounted. The elongated socket 70 is axially displaceable along the length of a pinion fitting 72 which, in the illustrated embodiment, is configurated as a regular hexagon. The socket 70 is internally configurated to mate with the fitting 72 for joint rotational movement. As the coupling shaft 56 is moved from side to side, the socket 70 remains engaged with the corresponding fitting 72 so that rotational mechanical movement may be imparted through the coupling formed by fitting 72 and socket 70 at any position along the line of lateral movement of the coupling shaft 56.

The fitting 72 is formed integral with a pinion 58 and a crank coupling 74. The pinion 58 is essentially identical in construction to pinion 54, and the crank coupling 74 is essentially identical to coupling 62.

The form of the couplings connected to the pinions on either the crank or the slidable connecting shaft ends may be of any suitable configuration and either male or female. The couplings shown in FIG. 2 are only a presently preferred embodiment and a reverse configuration may be equally advantageous. Of course, if the fittings are changed, the mating coupling on the crank and slidable coupling shaft must be changed accordingly.

With reference to FIG. 3, it will be observed that fittings 62 and 64 extend outside of the pinion housing 48. In a similar manner it should be recognized that fittings 72 and 74 (see FIGS. 1 and 2) likewise extend beyond the pinion housing 48.

As illustrated in FIG. 3, a rack 44 engages the exposed portion of the pinion 54. The apertures 74 in the rack are spaced such that they accurately engage the teeth 60 of the pinion 54. As will be observed from FIG. 3, the top edge of the pinion must be positioned vertically higher than the frame 22 to avoid interference between the rack 44 and the frame 22. The vertical position of the pinion 54 is adjustable by positioning the threaded vertical support 50.

The racks 44 are permanently attached to the bottom of the camper unit 76 in any conventional manner. As shown in FIG. 4, the racks 44 are spaced from one another on the underside of the camper 76. The lateral spacing of the racks is determined by the spacing of the pinion housings 48 along the frame 22 (see FIG. 1).

As best shown in FIG. 6, one end of the rack 44 is formed with an L-shaped projection 78. The L-shaped projection 78 is dimensioned in a manner which will permit leg 82 to pass into the notch 40 (see FIG. 5) of the interlocking retainer 24. Leg 84 of the L-shaped projection 78 is extended beyond leg 82 to such an extent that it will not enter the notch 40 of the interlocking retainer 24 (FIG. 5). When leg 84 contacts the side of the interlocking retainer or boss 24, the camper is fully loaded and may not be advanced further. Leg 84 advantageously prevents undesirable forward movement of the camper toward the truck cab (not shown) during braking and sudden stops.

When rack 44 and integral leg 82 are interposed within retainer 24, the rack and attached camper 76, frame 22 and truck bed detent through retainer 24 are all united together. Thus, the camper 76 will not lift from the truck bed 26 or laterally shift when the truck is exposed to shocks and vibrations during transit or as a result of strong wind.

On the opposite end of rack 44 detent elongation 80 is formed. Detent 80 is of sufficient width that it will contact the detent tab or boss 81 (see FIG. 3) of the pinion housing 48 thereby preventing accidental dropping of the camper from the end of the truck bed.

The detent 80 may be desirably placed on the other side of the rack 44 and extended to a length approximately equal to projection 84 on the other end of the rack 44. In that configuration, the interlocking retainer or boss 24 would prevent disengagement just as the detent tab or boss 81 (see FIG. 3) does in the embodiment illustrated.

The detent 80 has been found desirable to prevent camper damage particularly during unloading where the rearward momentum of the camper 76 relative to the truck bed 26 is great.

The camper unit 76 is shown in FIG. 4 with legs 85 and 86. The legs are shown for illustration purposes only. It will be recognized that any suitable conventional means of holding or elevating the camper to the level of the truck bed such as legs disclosed in U.S. Pat. No. 3,409,272 may be used. In the embodiment shown, front legs 85 are retractable and fold to a carrying position. Back legs 86 may or may not be foldable and are provided with rollers on the ends of the legs.

The apparatus described in accordance with the figures is a camper loading and securing system which requires only that the retainer 24 be attached permanently to the truck bed. When the camper 76 has been removed, the frame 22 is easily removed from the truck bed 26 merely by lifting the frame from the retainers 24.

THE METHOD

Prior to beginning to load a camper unit, the operator must remove the tailgate of the truck. Commonly, trucks provide for simplified one-or two-step removability of the tailgate.

The user then places the frame portion 22 (see FIG. 1) of the loader system over the interlocking retainers 24. The extensible vertical supports 50 are adjusted to provide support for the pinion housings 48 upon the truck bumper 51. Supports 50 need to be adjusted to a length which is sufficient to insure that the top edges of the pinions are elevated above the level of the frame 22. The truck is then backed toward the camper 72 to a position where the drive pinions 54 and 58 will be positioned immediately beneath the racks 44 on the underside of the camper. The truck must be backed sufficiently to place the detent 80 on the rack 44 beyond the detent tab or boss 81 on the pinion housing 48.

The extendable legs 85 (see FIG. 4) are then retracted to lower the rack 44 into mating relation with the pinions 54 and 58. Legs 85 may then be folded under the camper 72.

The slidable connecting shaft 56 (see FIG. 2) is moved to the far right position which couples pinions 58 and 54 in condition for unitary mechanical rotation. After the slidable connecting shaft 56 has been positioned for unitary rotation, a crank (not shown) may be inserted through the crank coupling 62. Since the pinions 54 and 58 are united, the crank could also be used on the other end of frame 22 in mechanical relation with crank coupling 74. The crank is then rotated in a direction which will cause the rack 44 and associated camper 72 to be translated forwardly with respect to the truck bed 26.

If for any reason the camper requires alignment with the truck bed, the slidable coupling shaft 56 may be moved to its left-most position as shown in FIG. 2, in order to facilitate independent rotation of either pinion 58 or 54 independently. After the slidable coupling shaft has been moved to provide for independent rotation, the crank may be inserted into either end of the frame 22 and rotated in a direction which will accommodate the alignment of the camper with respect to the truck bed. After the proper alignment has been accommodated, the slidable coupling shaft 56 may again be moved to its right-most position in order to again unite the pinions for joint movement. Clearly, the coupling direction could be reversed.

When the camper unit has been translated forward upon the truck bed to the point where the camper is balanced upon the truck bed, the rear legs 86 (FIG. 4) may be either removed or folded beneath the camping unit.

As shown by FIG. 6, when the camping unit reaches the fully loaded position, the extended portion 82 of the rack 44 passes within the notch 40 of the interlocking retainer 24. As the pinions 54 and 58 are turned further, the extension 84 of the rack 44 contacts the edge of the interlocking retainer 24 and prevents further forward movement. It should be recognized that extended portion 82 of the rack 44 is then secured from movement in either the vertical or horizontal direction by its engagement with notch 40 of the interlocking retainer 24.

At this point, the only direction in which the camper unit is free to move is in the rearward direction. A conventional camper tie-down means can then be used to secure the camper from such rearward movement. The unloading procedure is substantially the reverse of the described loading method.

In the case where rollers are not provided on the rear uprights, the truck may be placed in neutral gear after the pinions have been engaged at the front of the camper and rotation of the pinions then moves the truck under the camping unit rather than vice versa. It should be further noted that reference has been made to the use of a crank in rotating the pinions. Of course, any other suitable means of rotation which can accommodate selective and precise movements may be used, such as electric or hydraulic motors.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A camper loading and securing system comprising:
   a transportable bed;
   two pinion housings attached to the transportable bed at spaced side-by-side locations;
   a rack-engaging pinion mounted for rotation upon its axis within each housing, each pinion comprising means accommodating independent unlimited rotation thereof in both forward and reverse directions and at least one mechanical power coupling which is actable directly upon the axis to rotate each pinion; and
   means selectively connecting the pinions for unitary movement.

2. A camper loading and securing system comprising:
   a transportable bed;
   two pinion housings attached to the transportable bed at spaced side-by-side locations;
   a unitary frame joining the pinion housings and having spaced apertures adapted to be superimposed over corresponding retainers in the transportable bed such that the pinion housings and frame are easily removable from the transportable bed by lifting the frame from the retainers;
   a rack-engaging pinion mounted for rotation upon its axis within each housing, each pinion comprising means accommodating independent rotation thereof in both forward and reverse directions and at least one mechanical power coupling which is actable directly upon the axis to rotate each pinion; and
   means selectively connecting the pinions for unitary movement.

3. A system as defined in claim 2 wherein each pinion housing presents an upwardly directed tab.

4. A system as defined in claim 1 wherein said selectively connecting means is a coupling shaft coaxial with the pinions and displaceable from a first position accommodating independent unlimited rotation of each pinion to a second position accommodating joint rotation of the pinions.

* * * * *